(12) United States Patent
Boulet D'Auria et al.

(10) Patent No.: US 9,702,497 B2
(45) Date of Patent: Jul. 11, 2017

(54) RETAINING PLATE FOR A REINFORCING STRIP

(71) Applicant: 3X Engineering, Monaco (MC)

(72) Inventors: Stanislas Boulet D'Auria, Villefranche sur Mer (FR); Hacen Slimani, Nice (FR); Didier Daumas, Eze (FR)

(73) Assignee: 3X Engineering, Monaco (MC)

( * ) Notice: Subject to any disclaimer, the term of this patent is extended or adjusted under 35 U.S.C. 154(b) by 0 days.

(21) Appl. No.: 14/909,048

(22) PCT Filed: Jul. 30, 2014

(86) PCT No.: PCT/IB2014/001415
§ 371 (c)(1),
(2) Date: Jan. 29, 2016

(87) PCT Pub. No.: WO2015/015279
PCT Pub. Date: Feb. 5, 2015

(65) Prior Publication Data
US 2016/0186914 A1    Jun. 30, 2016

(30) Foreign Application Priority Data
Jul. 30, 2013 (MC) .......................................... 2594

(51) Int. Cl.
*F16L 55/16*        (2006.01)
*F16L 55/168*     (2006.01)
*F16L 58/16*       (2006.01)
*F16B 15/00*      (2006.01)

(52) U.S. Cl.
CPC ...... *F16L 55/1686* (2013.01); *F16B 15/0023* (2013.01); *F16L 58/16* (2013.01); *F16B 2015/0069* (2013.01)

(58) Field of Classification Search
CPC .............. F16L 55/1686; F16B 15/0023; F16B 15/0007; F16B 15/0046
USPC .............. 138/98, 97; 156/191; 411/457, 458
See application file for complete search history.

(56) References Cited

U.S. PATENT DOCUMENTS

| D36,812 | S | | 10/1862 | Twining | |
|---|---|---|---|---|---|
| 1,247,933 | A | * | 11/1917 | Colpitts | .................. F16B 15/08 411/444 |
| 2,726,419 | A | * | 12/1955 | Saks | .................. A47G 27/0462 16/16 |

(Continued)

FOREIGN PATENT DOCUMENTS

| EP | 0542587 | 5/1993 |
|---|---|---|
| GB | 2194903 | 3/1988 |
| GB | 2214427 | 9/1989 |

*Primary Examiner* — Patrick F Brinson
(74) *Attorney, Agent, or Firm* — James C. Lydon

(57) ABSTRACT

A retaining plate (30) made from a rigid material having tips on each of the two faces of same, the tips of each of the faces of a length of between 1 and 3 mm making an angle in the forward direction with the face of between 30° and 60°. The retaining plate is secured by the tips of one of the faces of same at the final end (28) of a first reinforcing strip (26) already positioned on the degraded portion of a pipe, and secured to the initial end (32) of a second reinforcing strip to be wound following the first reinforcing strip by the tips of the other face, said tips being tilted towards the initial end (32) of the second reinforcing strip.

7 Claims, 2 Drawing Sheets

(56) References Cited

U.S. PATENT DOCUMENTS

| | | | | |
|---|---|---|---|---|
| 3,143,030 A | * | 8/1964 | Muller | F16B 15/0015 |
| | | | | 411/461 |
| 3,372,444 A | * | 3/1968 | Mathison | F16B 15/0023 |
| | | | | 24/306 |
| 3,967,524 A | * | 7/1976 | Snow | E04F 13/0835 |
| | | | | 411/461 |
| 4,679,367 A | | 7/1987 | Geisthardt | |
| 5,814,387 A | * | 9/1998 | Orihara | F16L 55/1686 |
| | | | | 138/97 |
| 5,894,864 A | * | 4/1999 | Rich | F16L 55/1686 |
| | | | | 138/97 |
| 5,988,224 A | | 11/1999 | D'Auria | |
| 6,334,465 B2 | | 1/2002 | D'Auria | |
| 6,543,487 B2 | * | 4/2003 | Bazinet | B29C 53/8016 |
| | | | | 138/97 |
| 7,370,676 B2 | * | 5/2008 | d'Auria | F16L 55/175 |
| | | | | 138/132 |
| 7,635,007 B2 | | 12/2009 | D'Auria et al. | |
| 8,978,709 B2 | | 3/2015 | D'Auria | |

* cited by examiner

RETAINING PLATE FOR A REINFORCING STRIP

TECHNICAL FIELD

The present invention relates to the repair of pipes used for carrying fluid such as oil and relates in particular to a retaining plate for a strip of reinforcing tape used in the repair of the fluid carrying pipes.

PRIOR ART

Repairing a pipe that carries fluid such as a pipeline for carrying oil, when it is damaged, always involves bandaging a reinforcing tape around the damaged part of the pipe. This reinforcing tape is generally made of a flexible material having very good tensile mechanical properties such as a high breaking strength. Such a material is preferably Kevlar (registered trade name) from the aramid family, or fiberglass.

FIG. 1 shows a pipe 10 comprising a damaged portion 14 at its periphery. For the repair, the first thing is to plug the damaged part using a polymer resin. Next, a bandage 16 is fitted over the damaged part. Such a bandage is made up of a reinforcing tape surrounding the pipe and covered with a crosslinking resin as the reinforcing tape is gradually wound.

Note that a bandage may also be installed on the part of a pipe that has become thinner as a result of damage to the inside of the pipe.

FIG. 2 shows how the reinforcing tape is fitted. The start of the tape 20 is first of all fixed to the pipe by any suitable means. Next, the reinforcing tape is wound under tension around the pipe, each turn of the winding overlapping part of the previous winding, generally half the width of the reinforcing tape.

However, because a reinforcing tape has to have a finite length, this length may be insufficient to bandage the damaged part of the pipe and it is often necessary to wind at least one other reinforcing tape at the end of the first reinforcing tape. Because the reinforcing tape is wound under tension, it is unfortunately difficult to hold it in place and prevent it from slipping at least during the initial stages of winding.

SUMMARY OF THE INVENTION

This is why the object of the invention is to provide a means that prevents a new reinforcing tape from slipping when it is being wound under tension.

Another object of the invention is to provide a means that allows a new reinforcing tape to be secured while it is being wound at the end of another reinforcing tape that has already been wound around a pipe.

The main subject of the invention is therefore a retaining plate made of rigid material comprising spikes on each of its two faces, the spikes on each of the faces, of a length of between 1 and 3 mm, making an angle of between 30° and 60° with the base of the face on which they lie, the plate being, on the one hand, secured by the spikes of one of its faces to a first reinforcing tape already placed on the damaged portion of a pipe, said spikes being inclined toward the tail end of the first reinforcing tape and, on the other hand, secured to a second reinforcing tape that is to be wound on after the first reinforcing tape by the spikes of the other face, said spikes being inclined toward the starting end of the second reinforcing tape.

Another subject of the invention is a method of installing a new reinforcing tape after a first reinforcing tape wound around a damaged part of a pipe, consisting in placing a retaining plate according to the invention on the tail end of said first reinforcing tape so as to secure the plate to the first reinforcing tape using the spikes on the underside face of the plate, then in placing the starting end of the new reinforcing tape on the plate so as to secure the new tape to the plate using the spikes on the top face of the plate.

BRIEF DESCRIPTION OF THE FIGURES

The objects, subjects and features of the invention will become more clearly apparent from reading the following description given with reference to the drawings in which.

DETAILED DESCRIPTION OF THE INVENTION

Figure 1:
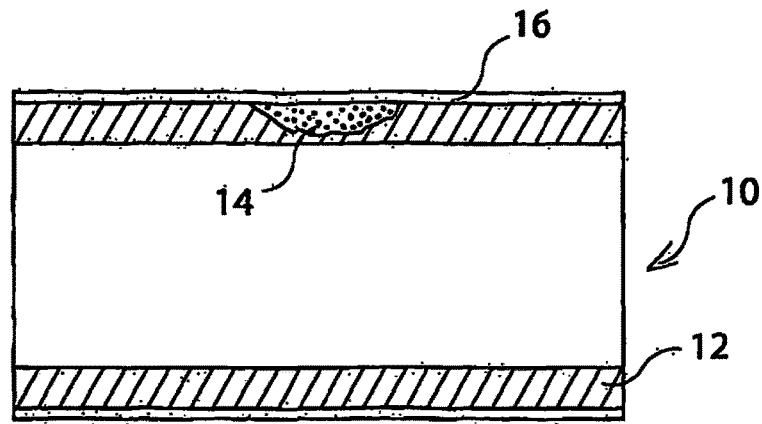
FIG. 1 depicts a damaged external part of a pipe which has been repaired by fitting a bandage.
Figure 2:
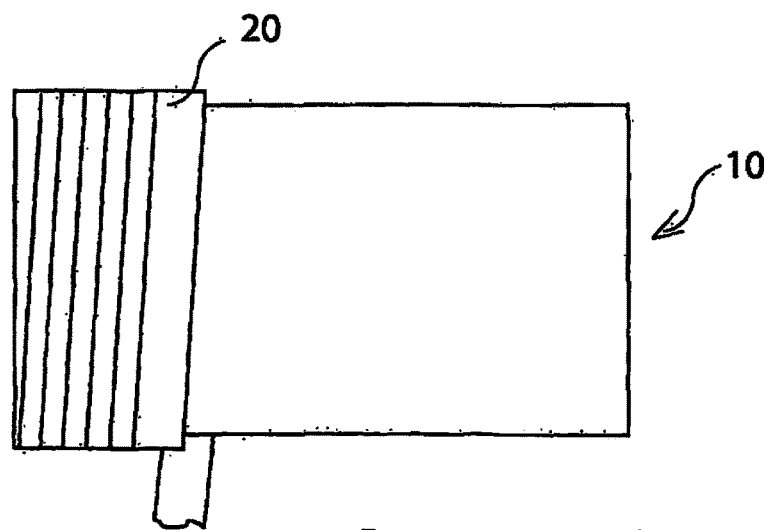
FIG. 2 depicts a damaged internal part of a pipe which has been repaired by fitting a bandage.

FIGS. 1 and 2 which relate to a pipe that has a damaged portion for which the repair consists in fitting a bandage have already been described in the prior art.

Figure 3:
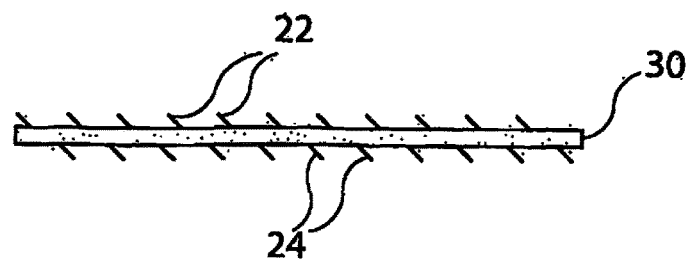
FIG. 3 is a view in cross section of a retaining plate according to the invention.

FIG. 3 depicts a retaining plate according to the invention, viewed in section. The actual plate 30 is made of a rigid material which can be any suitable substance such as very hard plastic or preferably metal such as steel, aluminum, etc. The plate is generally of rectangular shape with the width less than or equal to the width of the reinforcing tape.

The retaining plate 30 has spikes 22 on one face and spikes 24 on the other face. These spikes, which are between 1 and 3 mm long, are inclined with respect to the face of the plate. This inclination corresponds to an acute angle of between 30° and 60°, preferably of 45°, in the direct direction with respect to the face on which they lie. Note that, in this last instance, the spikes on the two faces of the plate are parallel.

One embodiment of the plate involves using a metal mesh. The spikes are formed by cutting the sides of the grid cells of the mesh at regular intervals and bending them up with respect to the mesh by a determined angle of between 30° and 60° in the direct direction with respect to the face.

Figure 4:
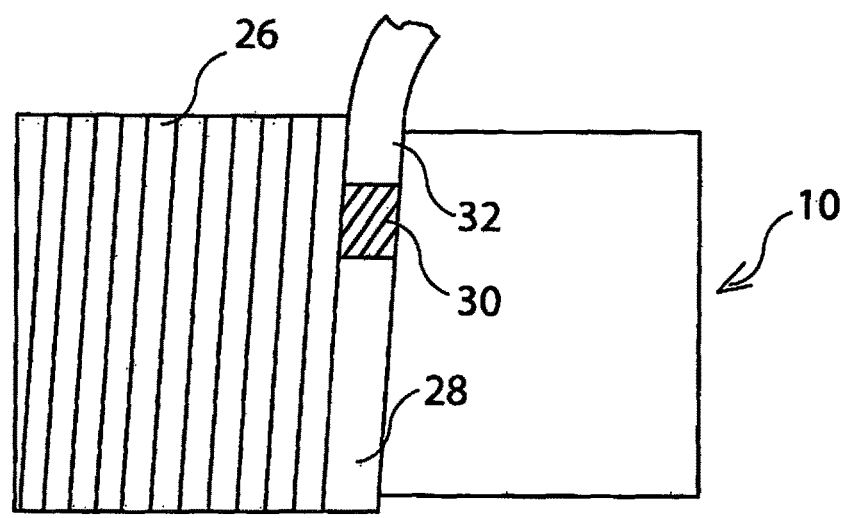
FIG. 4 depicts the fitting of a new reinforcing tape using a retaining plate according to the invention.

FIG. 4 shows how the retaining plate 30 with its spikes 22 and 24 depicted in FIG. 3 is used. The first reinforcing tape 26 is wound around the damaged part of the pipe 10 as explained with reference to FIG. 3, as far as its tail portion 28. A retaining plate 30 according to the invention is then placed over the end of this tail portion so as to be secured to the reinforcing tape using the spikes on the underside face of the plate which bite into the reinforcing tape. Note that the plate is placed on the reinforcing tape in such a way that the spikes on the underside face are inclined toward the tail end of the tape 26 already wound so that, when tension is applied to the retaining plate toward the end of the tape, the plate is held firmly in place.

Next, the starting end 32 of the new reinforcing tape is placed on the retaining plate in such a way as to be secured to the retaining plate using the spikes thereof which bite into this tape. Note that the spikes on the top face of the plate are inclined toward the starting end 32 of the new tape so that tension applied to the new reinforcing tape as it is wound holds the tape firmly in place, whereas if the spikes faced in the other direction, the tape would detach from the plate under the effect of the tension.

Thus, because the spikes on the top face of the plate make an acute angle of between 30° and 60° with the reinforcing tape, which means to say because they are substantially in the same direction as the spikes on the underside face, the new reinforcing tape is held firmly to the plate and the latter to the first reinforcing tape and is therefore secured to the first reinforcing tape. It is therefore easy to proceed with winding the new reinforcing tape under tension without the risk of this tape slipping as a result of the tension.

In a preferred embodiment described in Monaco patent application No. 2593, each reinforcing tape comprises at least one conducting wire incorporated in the longitudinal direction, the electrical properties of the wire (or wires) being used for the operations including the crosslinking of the resin, detecting the bandaged portion of the pipe or detecting repaired portions of pipe that have experienced an increase in diameter caused by a thinning of the wall. The integrated conducting wire is preferably an integrated metal wire.

As mentioned previously, the retaining plate is preferably made of metal. Using this preferred embodiment, the two metal edges of the plate are therefore in contact with the end of the (or of the wires) integrated into each of the reinforcing tapes connected by the retaining plate. Thus, the retaining plate ensures the physical continuity of the set of reinforcing tapes and also ensures the electrical continuity thereof.

The invention claimed is:

1. A retaining plate made of rigid material (30) comprising spikes (22, 24) on each of its two faces, the spikes on each of the faces, of a length of between 1 and 3 mm, making an angle of between 30° and 60° with the base of the face on which they lie, said plate being, secured by the spikes of one of its faces to a first reinforcing tape (26) already placed on the damaged portion of a pipe, said spikes being inclined toward the tail end of said first reinforcing tape, the plate being further, secured to a second reinforcing tape that is wound on after the first reinforcing tape by the spikes of the other face, said spikes being inclined toward the starting end (32) of said second reinforcing tape.

2. The retaining plate (30) as claimed in claim 1, in which said spikes (22, 24) make an angle of 45° in the direct direction with the face on which they lie.

3. The retaining plate (30) as claimed in claim 1, in which said rigid material is metal.

4. The retaining plate (30) as claimed in claim 3, said plate being a metal mesh and said spikes being formed by cutting the sides of the grid cells of the mesh at regular intervals and bending them up with respect to the mesh by a determined angle of between 30° and 60°.

5. The retaining plate (30) as claimed in claim 1, made of metal so that said plate is in contact at its two ends with a conducting wire incorporated into each of said first and second reinforcing tapes so as to ensure electrical continuity between said reinforcing tapes.

6. A method of installing a second reinforcing tape after a first reinforcing tape wound around a damaged part of a pipe, consisting in placing a retaining plate (30) as claimed in claim 1 on the tail end of said first reinforcing tape so as to secure said plate to the first reinforcing tape using the spikes on the underside face of the plate, then in placing the starting end (32) of the new reinforcing tape on said plate so as to secure said tape to said plate using the spikes on the top face of the plate.

7. The retaining plate (30) as claimed in claim 3, wherein the metal of said rigid material is steel.

* * * * *